(12) United States Patent
Kim et al.

(10) Patent No.: US 7,777,831 B2
(45) Date of Patent: Aug. 17, 2010

(54) OPTICAL SHEET AND DISPLAY DEVICE HAVING THE SAME

(75) Inventors: Joong-Hyun Kim, Suwon-si (KR); In-Sun Hwang, Suwon-si (KR); Seong-Yong Hwang, Seongnam-si (KR); Kang-Woo Lee, Seoul (KR)

(73) Assignee: Samsung Electronics Co., Ltd. (KR)

( * ) Notice: Subject to any disclaimer, the term of this patent is extended or adjusted under 35 U.S.C. 154(b) by 742 days.

(21) Appl. No.: 11/668,485

(22) Filed: Jan. 30, 2007

(65) Prior Publication Data

US 2007/0188861 A1   Aug. 16, 2007

(30) Foreign Application Priority Data

Feb. 10, 2006   (KR) .................... 10-2006-0012807

(51) Int. Cl.
- *G02F 1/1335* (2006.01)
- *F21V 5/04* (2006.01)
- *G02B 27/10* (2006.01)

(52) U.S. Cl. .......... 349/62; 362/339; 359/628; 359/625

(58) Field of Classification Search ........... 349/62, 349/64; 362/339; 359/625, 628
See application file for complete search history.

(56) References Cited

U.S. PATENT DOCUMENTS

| | | | |
|---|---|---|---|
| 5,600,455 A | 2/1997 | Ishikawa et al. | |
| 2006/0103777 A1* | 5/2006 | Ko et al. | 349/65 |

* cited by examiner

*Primary Examiner*—Jerry T Rahll
(74) *Attorney, Agent, or Firm*—Cantor Colburn LLP

(57) ABSTRACT

An optical sheet includes a first plane, a second plane facing the first plane and a plurality of optical patterns. The optical patterns are formed on the second plane along a plurality of columns. An optical pattern includes a plurality of convex light-condensing portions. End portions of the light-condensing portions are connected to each other continuously and form crests and troughs. The optical patterns disposed in adjacent columns share a common side.

19 Claims, 16 Drawing Sheets

OPTICAL SHEET AND DISPLAY DEVICE HAVING THE SAME

This application claims priority to Korean Patent Application No. 2006-0012807 filed on Feb. 10, 2006, and all the benefits accruing therefrom under 35 U.S.C. §119, the contents of which are herein incorporated by reference in their entirety.

BACKGROUND OF THE INVENTION

1. Field of the Invention

The present invention relates to an optical sheet and a display device having the same. More particularly, the present invention relates to an optical sheet improving light-condensing efficiency and a display device having the optical sheet.

2. Description of the Related Art

In a liquid crystal display ("LCD") display device, an optical sheet is used for improving the optical characteristic, such as brightness and front brightness, of light provided to a display panel. The optical sheet may include a film, such as a polyester sheet having adhesive property used as a base film, and ultraviolet curable resin laminated on the base film.

The optical sheet may include a prism sheet improving front brightness by converging the advance direction of light into a perpendicular direction to a display panel. A prism sheet such as is shown in FIG. 10 of the U.S. Pat. No. 5,600,455 includes prisms having a triangle shape in the cross-section view and extended to one direction. The prism sheet condenses incident light on plane perpendicular to the direction of prisms, into the perpendicular direction of the prism sheet, but cannot condense incident light on plane parallel into the direction of prisms.

Two prism sheets may be disposed in perpendicular to each other are used for condensing light into vertical and horizontal directions. However, the prisms mentioned above have technical difficulties for the price and the weight.

BRIEF SUMMARY OF THE INVENTION

An exemplary embodiment provides an optical sheet capable of improving light-condensing efficiency.

An exemplary embodiment provides a display device having the above-mentioned optical sheet.

In an exemplary embodiment, an optical sheet includes a first plane, a second plane opposite to the first plane and a plurality of optical patterns formed on the second plane along a plurality of columns. The plurality of columns includes a plurality of convex light-condensing portions formed on the optical patterns and connected to each other and forming crests and troughs. The optical patterns disposed in adjacent columns share a common side.

In an exemplary embodiment, crests of the optical patterns disposed in odd-numbered columns correspond to troughs of the optical patterns disposed in even-numbered columns.

In an exemplary embodiment, the crests of the optical patterns disposed in the odd-numbered columns have a first height with respect to the second plane and the troughs of the optical patterns disposed in the even-numbered columns have a second height, which is higher than the first height.

In an exemplary embodiment, the optical patterns disposed in the odd-numbered columns and the optical patterns disposed in the even-numbered columns share a common side.

In an exemplary embodiment, the troughs of the optical patterns disposed in the odd-numbered columns and the troughs of the optical patterns disposed in the even-numbered columns have substantially the same height with respect to the second plane.

In an exemplary embodiment, common side of the optical patterns in the adjacent columns may form a zigzag shape along a longitudinal direction of the columns. The common side of the optical patterns in the adjacent columns may form a wave shape along a longitudinal direction of the columns.

In an exemplary embodiment, the light-condensing portion may include two first ridges and two second ridges. The first ridges between each of the troughs and adjacent crests are oriented along a longitudinal direction of the columns, and the second ridges between each of the troughs and the adjacent crests are oriented along a horizontal direction substantially in perpendicular to the longitudinal direction.

In an exemplary embodiment, the first ridges are disposed in each of the odd-numbered columns form a first vertex angle, and the first ridges disposed in each even-numbered columns form a second vertex angle, which is greater than the first vertex angle. The first vertex angle and the second vertex angle are between about 85 degrees and about 95 degrees. The second ridges are connected to the troughs of the adjacent columns.

In an exemplary embodiment, a cross-section of the light-condensing portion taken along a horizontal direction that is substantially in perpendicular to a longitudinal direction of the columns has a rugby football shape.

In an exemplary embodiment, a display device includes a backlight assembly emitting light, an optical sheet and a display panel disposed on the optical sheet to display images based on the light provided from the optical sheet. The optical sheet includes a first plane, a second plane opposite to the first plane and a plurality of optical patterns. The optical patterns include a plurality of convex light-condensing portions. The end portions of the convex light-condensing portions are connected with each other continuously and forms crests and troughs along a plurality of columns on the second plane. The crests of the optical patterns in the odd-numbered columns correspond to the troughs of the optical patterns in the even-numbered columns, and the optical patterns disposed in adjacent columns share a common side. The display panel is disposed on the optical sheet and displays images based on the light provided from the optical sheet.

In an exemplary embodiment, the backlight assembly includes a light source disposed under the optical sheet to generate the light and a diffusion plate disposed between the light source and the optical sheet to diffuse the light. The display device further includes a diffusing sheet disposed between the diffusion plate and the optical sheet.

In an exemplary embodiment, the backlight assembly includes a light source generating the light and a light guide unit guiding the light incident into the light guide unit through a side surface of the light guide unit to emit the light to the optical sheet.

In an exemplary embodiment, the display device further includes a protective sheet disposed on the optical sheet to protect the optical patterns.

In an exemplary embodiment, the amount of light condensed is increased by increasing a density of the light-condensing portions. Advantageously, brightness provided to the display panel is improved.

BRIEF DESCRIPTION OF THE DRAWINGS

The above and other advantages of the present invention will become readily apparent by reference to the following detailed description when considered in conjunction with the accompanying drawings.

DETAILED DESCRIPTION OF THE INVENTION

Figure 1:
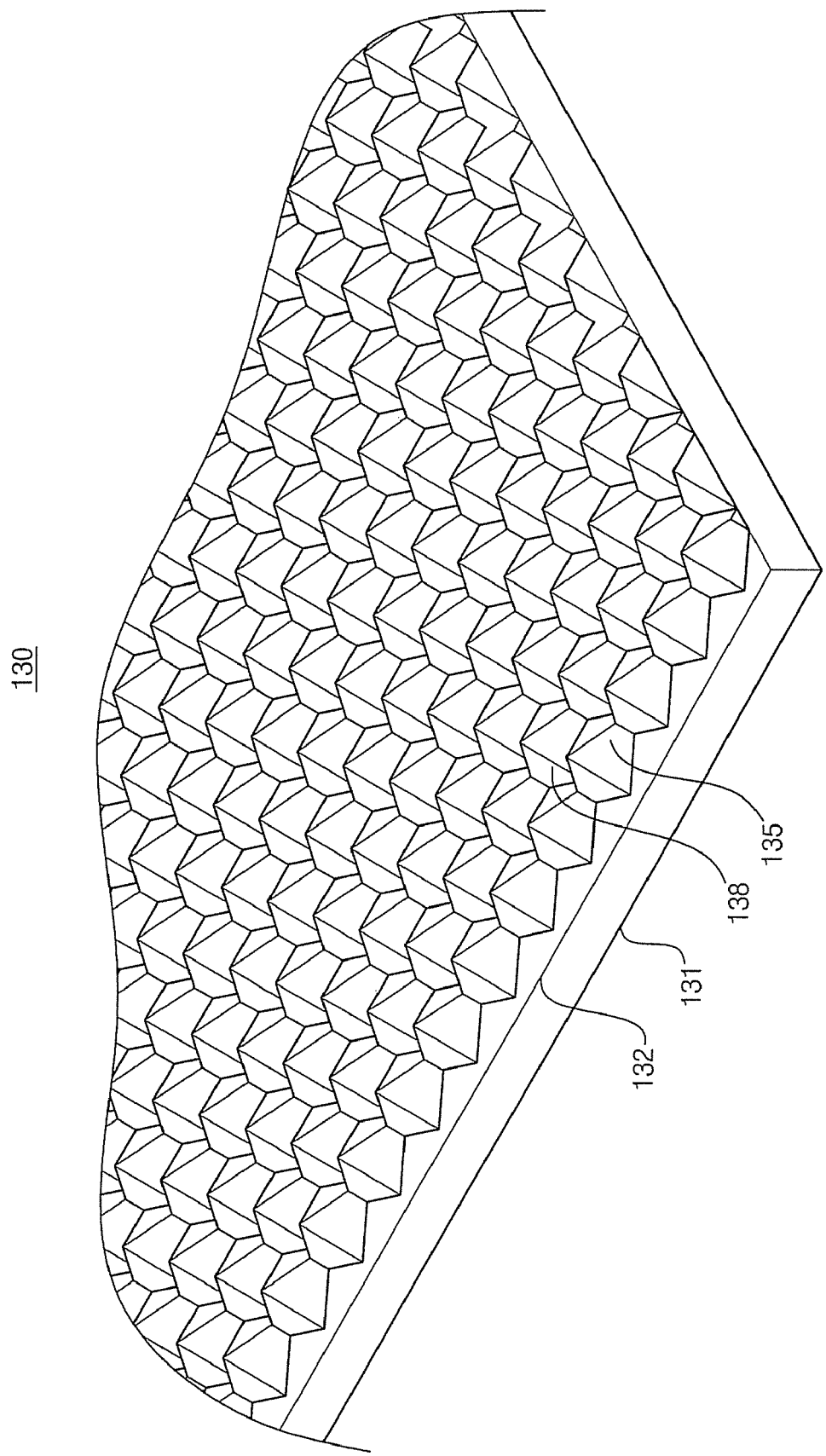
FIG. 1 is a partial perspective view of an exemplary embodiment of an optical sheet in accordance with the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on" or "connected to" another element or layer, it can be directly on or connected to the other element or layer or intervening elements or layers may be present. In contrast, when an element is referred to as being "directly on" or "directly connected to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "lower," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

FIG. 1 is a partial perspective view of an exemplary embodiment of an optical sheet in accordance with the present invention.

Referring to FIG. 1, the optical sheet 130 includes a first plane 131, a second plane 132 and a plurality of optical patterns 135 and 138.

The optical sheet 130 may include a polymer resin having relatively good light transmissivity, thermal resistance, chemical resistance and mechanical strength. Exemplary embodiments of the polymer resin include, but are not limited to, polymethylmethacrylate, polyamide, polyimide, polypropylene and polyurethane and so on.

The first plane 131 is formed as a substantially rectangular shape and the second plane 132 faces the first plane 131. The first plane 131 and the second plane 132 are substantially parallel to each other. The optical patterns 135 and 138 are formed on the second plane 132 along a plurality of columns when viewed on a plane. The optical patterns 135 and 138 include a plurality of convex light-condensing portions. The light-condensing portions are connected to each other continuously along the columns. Crests and troughs J1 and J2 (See, FIG. 2) are disposed repeatedly on the optical patterns 135 and 138.

The light-condensing portion includes two first ridges and two second ridges. The first ridges are extended along the columns from the troughs J1 and J2 to the crests. The second ridges are extended to the crests in a direction substantially perpendicular to the columns. The optical patterns 135 and 138 include vertexes where the first ridges and the second ridges meet.

Figure 2:
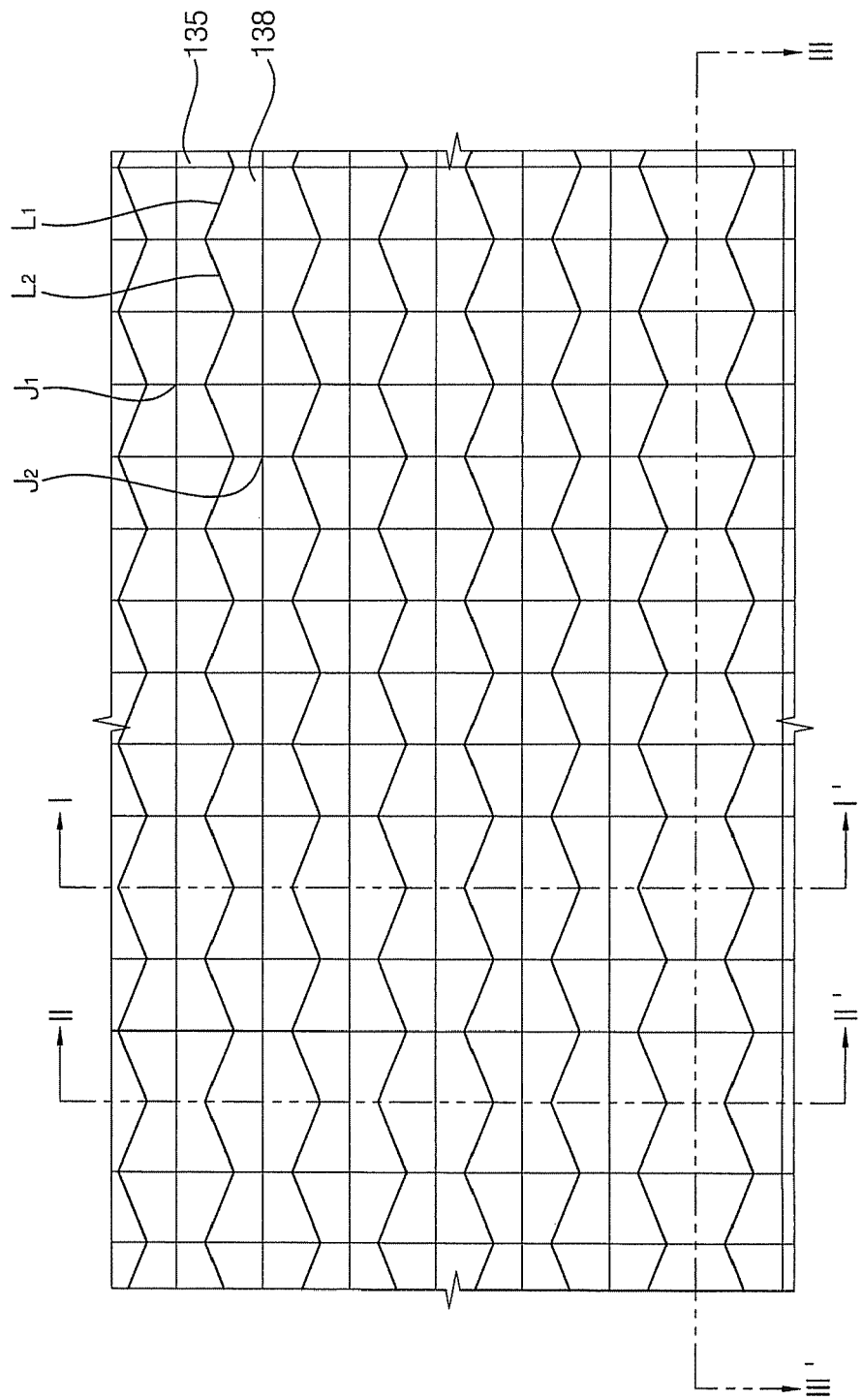
FIG. 2 is a plan view of the optical sheet shown in FIG. 1.

FIG. 2 is a plan view of the optical sheet showing in FIG. 1.

Referring to FIGS. 1 and 2, a crest of an optical pattern 135 disposed in an odd-numbered column corresponds to a trough of an optical pattern 138 disposed in an even-numbered column. A height of the crest of the optical pattern 135 is substantially the same as a height of the crest of the optical pattern 138. The crests of the optical patterns 135 and 138 alternate in a direction substantially parallel to the columns.

Hereinafter, the optical pattern disposed in an odd-numbered column is called as a first optical pattern 135 and the optical pattern disposed in an even-numbered column is called as a second optical pattern 138. For increasing the density of light-condensing portion, a first outline L1 of the first optical pattern 135 and a second outline L2 of the second optical pattern 138 preferably may share a common side. As in the illustrated exemplary embodiment, the first outline L1 and the second outline L2 share a common side forming a zigzag shape in a direction of the columns.

Figure 3:
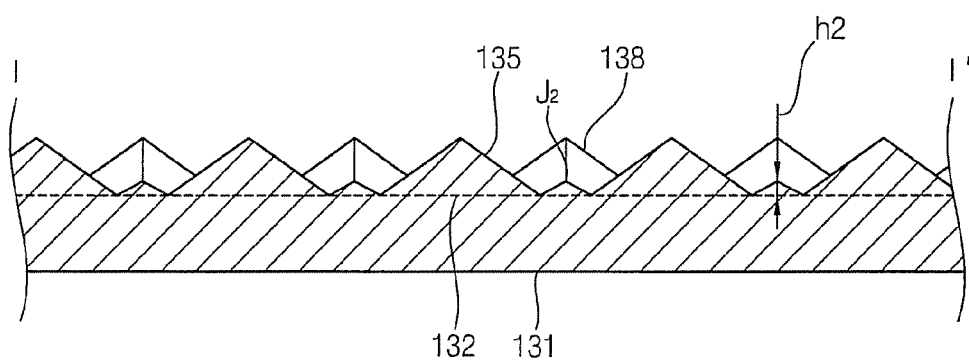
FIG. 3 is a partial cross-sectional view taken along line I-I' of the optical sheet in FIG. 2.
Figure 4:
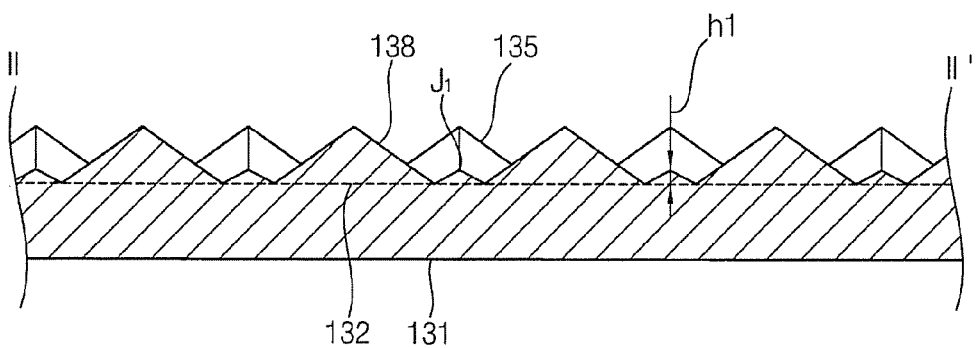
FIG. 4 is a partial cross-sectional view taken along line II-II' of the optical sheet in FIG. 2.
Figure 5:
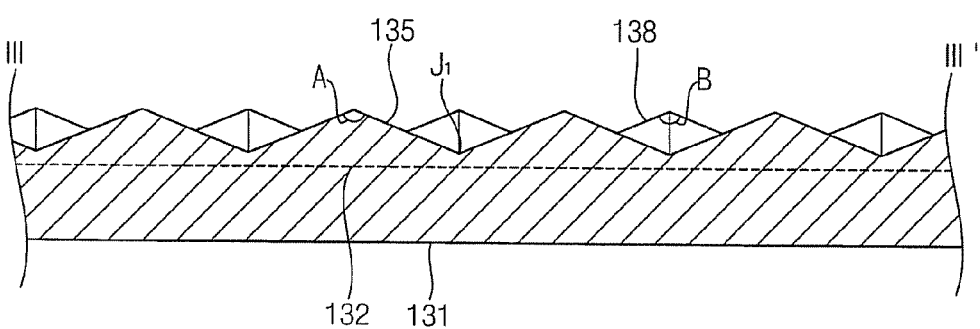
FIG. 5 is a partial cross-sectional view taken along line III-III' of the optical sheet in FIG. 2.

FIG. 3 is a partial cross-sectional view taken along line I-I' of the optical sheet in FIG. 2. FIG. 4 is a partial cross-sectional view taken along line II-II' of the optical sheet in FIG. 2. Particularly, FIGS. 3 and 4 are cross-sectional views taken from the crest of the first optical pattern 135 and the crest of the second optical pattern 138, respectively, along the perpendicular direction to the columns. FIG. 5 is a cross-sectional view taken from the crest of the first optical pattern 135 along the direction (e.g., parallel) of columns.

Referring to FIGS. 3 and 4, the troughs J1 of the first optical pattern 135 have a first height h1 with respect to the second plane 132. The troughs J2 of the second optical pattern 138 have a second height h2 with respect to the second plane 132. The second height h2 is greater than the first height h1. A height from an upper surface of the optical sheet 130 (e.g., an upper surface of the first and second optical patterns 135 and 138) to the first plane 131 is increased and decreased repeatedly along a column direction, a row direction and a direction corresponding to the column direction and the row direction (e.g., a diagonal direction).

FIG. 5 is a partial cross-sectional view taken along line III-III' of the optical sheet in FIG. 2. Particularly, FIG. 5 is a cross-sectional view taken from the crest of the first optical pattern 135 along the direction of the odd-numbered column.

Referring to FIG. 5, the first ridges J1 of the first optical pattern 135 are crossed at a corner and form a first vertex angle A The second ridges J2 of the second optical pattern 138 form a second vertex angle B. As mentioned above, the troughs J1 of the first optical pattern 135 have the first height h1 with respect to the second plane 132 and the troughs J2 of the second optical pattern 138 have the second height h2 with respect to the second plane 132, the second height h2 being greater than the first height h1, whereby, the second vertex angle B is bigger than the first vertex angle A.

In exemplary embodiments, the first vertex angle A may change according to the requested amounts of light condensed in the optical sheet 130. As in the illustrated embodiment, the first vertex angle A may be between about 85 degrees and about 95 degrees.

The following Table 1 represents result of testing the amounts of light condensed in the optical sheet 130 when the first vertex angle A was 90 degrees, with changing the second vertex angle.

TABLE 1

| | The second vertex angle (degree) | Pitch (μm) | The second trough height (μm) | Viewing angle (degree) | |
| --- | --- | --- | --- | --- | --- |
| | | | | Row direction | Column direction |
| Prism sheet | 180 | 80 | 40 | 82 | 108 |
| Example 1 | 152 | 160 | 20 | 82 | 100 |
| Example 2 | 127 | 80 | 20 | 83 | 94 |
| Example 3 | 90 | 0 | 0 | 88 | 88 |

In Table 1, when the cross-section of the trough J2 of the second optical pattern 138 is taken along the row direction, the pitch is the length (e.g., taken along the row direction) of the base line of the cross-section. The viewing angle is defined as the angle, where the amount of emitted light is more than a brightness standard, and when light is radiated on the first plane 131 and light emitting from the optical sheet 130 is observed at the direction which forms a designated angle with a perpendicular direction of the optical sheet 130.

Referring to the above table, when the first vertex angle A was fixed at 90 degrees and the second vertex angle B decreased to 152 degrees, 127 degrees and 90 degrees, the viewing angle of the row direction was not significantly changed, but the viewing angle of the column direction was decreased 18.5% as compared to the (normal) prism sheet.

The decrease of the column direction is considered as improving the amount of condensing light. In particular, this is considered improving the amount of condensing light to the column direction of the optical sheet 130.

Figure 6:
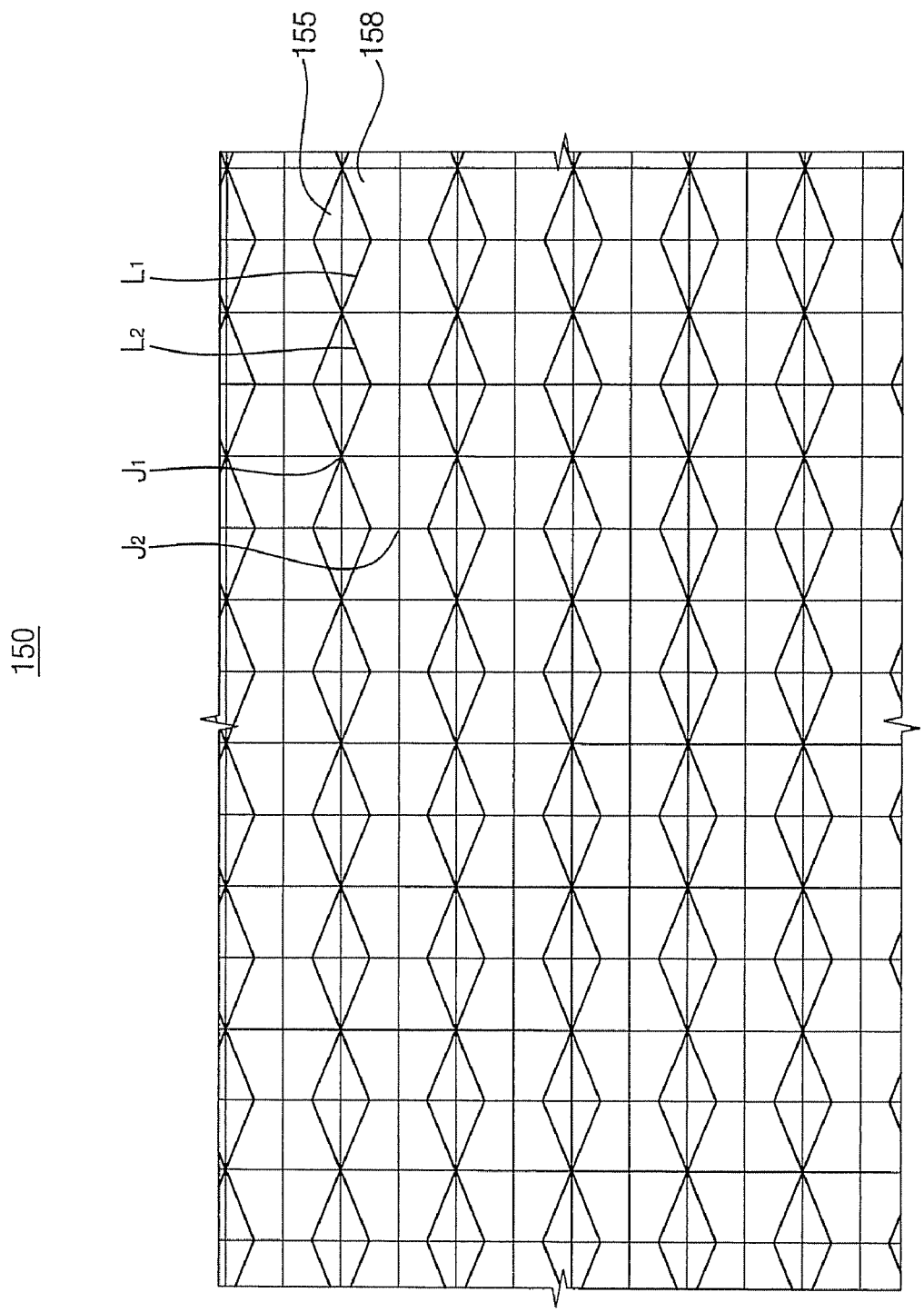
FIG. 6 is a plan view of another exemplary embodiment of an optical sheet in accordance with the present invention.

FIG. 6 is a plan view of another exemplary embodiment of an optical sheet in accordance with the present invention.

Referring to FIG. 6, an optical sheet 150 includes a first plane 131, a second plane 132, a first optical pattern 155 and a second optical pattern 158. The optical sheet 150 is substantially the same as the optical sheet 130 in FIGS. 1 to 5 except a method to connect the light-condensing portion of the first and the second optical patterns 155 and 158.

The first and second optical patterns 155 and 158 include different shapes from each other. A first outline L1 of the first optical pattern 155 includes a diamond chain shape and the vertexes of the diamond chain shape are connected to each other. A second outline L2 of the second optical pattern 158 includes a hexagon chain shape having common sides. The first outline L1 of the first optical pattern 155 and the second outline L2 of the second optical pattern 158 have a common side.

The troughs J1 of the first optical pattern 155 adjoins the second plane 132, and the troughs J2 of the second optical pattern 158 have a gap from the second plane 132. A first height h1 of trough J1 of the first optical pattern 155 with respect to the second plane 132 is considered to be zero (e.g., "0"), while a second height h2 of the second optical pattern 158 with respect to the second plane 132 is considered to be greater than zero (e.g., due to the "gap"). For increasing the density of light-condensing portion, a first outline L1 of the first optical pattern 155 and a second outline L2 of the second optical pattern 158 may share a common side. As in the illustrated exemplary embodiment, the first outline L1 and the second outline L2 share a common side forming a zigzag shape in a direction of the columns.

Figure 7:
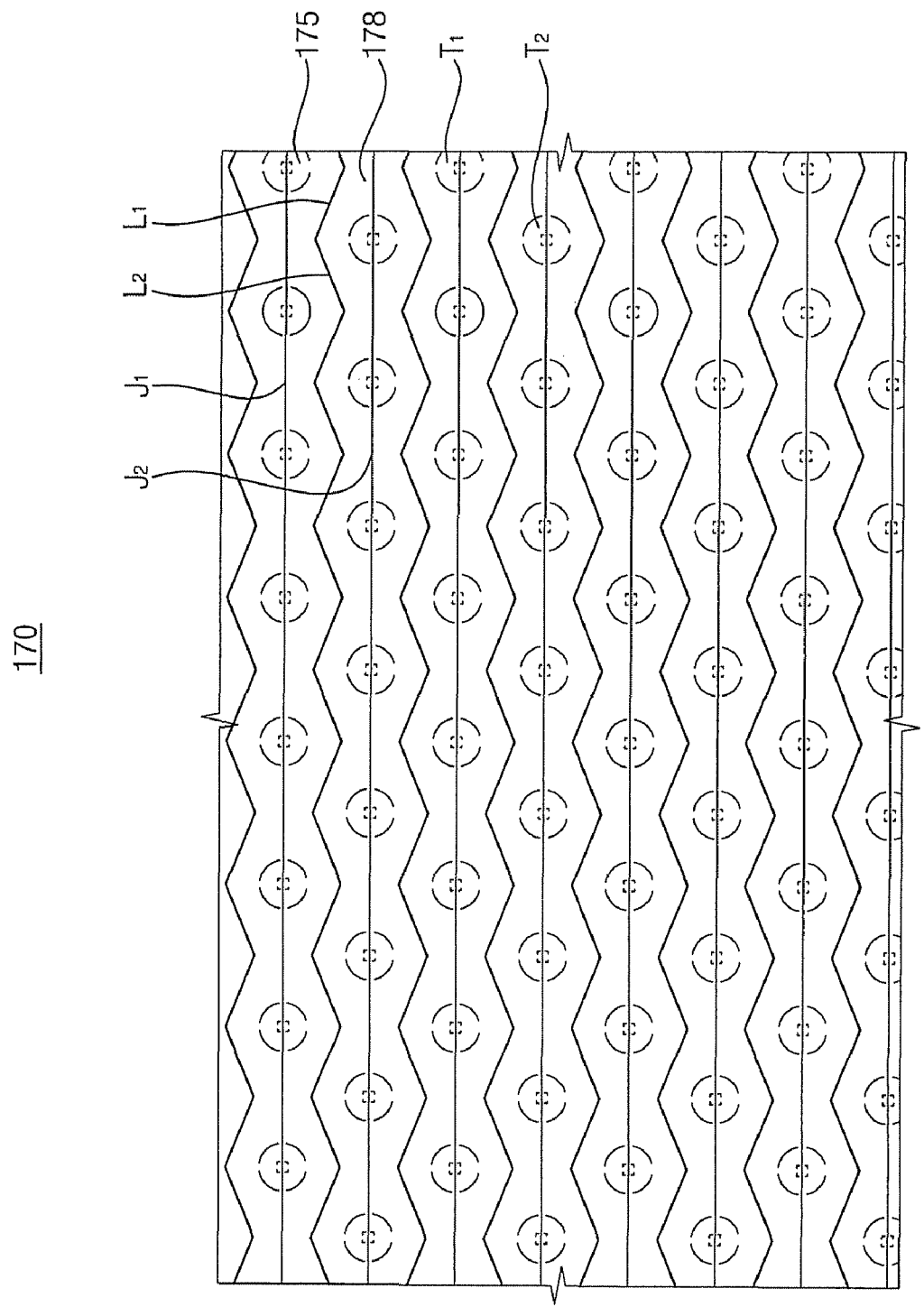
FIG. 7 is a plan view of another exemplary embodiment of an optical sheet in accordance with the present invention.

FIG. 7 is a plan view of another exemplary embodiment an optical sheet in accordance with the present invention.

Referring to FIG. 7, an optical sheet 170 includes a first plane 131, a second plane 132, a first optical pattern 175 and a second optical pattern 178. The optical sheet 170 is substantially the same as the optical sheet 130 in FIGS. 1 to 5 except shapes of the first and the second optical patterns 175 and 178.

Vertex portions T1 and T2 of light-condensing portions of the first optical pattern 175 and the second optical pattern 178 are rounded. The first and the second optical patterns 175 and 178 are substantially the same as the first and the second optical patterns 135 and 138 in FIGS. 1 to 5 except for having two first ridges.

In particular, the light-condensing portions have the two first ridges from a trough J1 and J2 to a crest of the first optical pattern 175 and the second optical pattern 178 along a column direction. The cross-section of the light-condensing portion 175 taken from the crest along the column direction is rounded and two sides toward the vertex are curved. Thus, the light-condensing portion 175 includes two curved surfaces having a symmetrical form on the column. Moreover, a width of a cross-section of the light condensing portion in odd-numbered columns may be greater than a width of a cross section of the light condensing portion in even-numbered columns.

Figure 8:
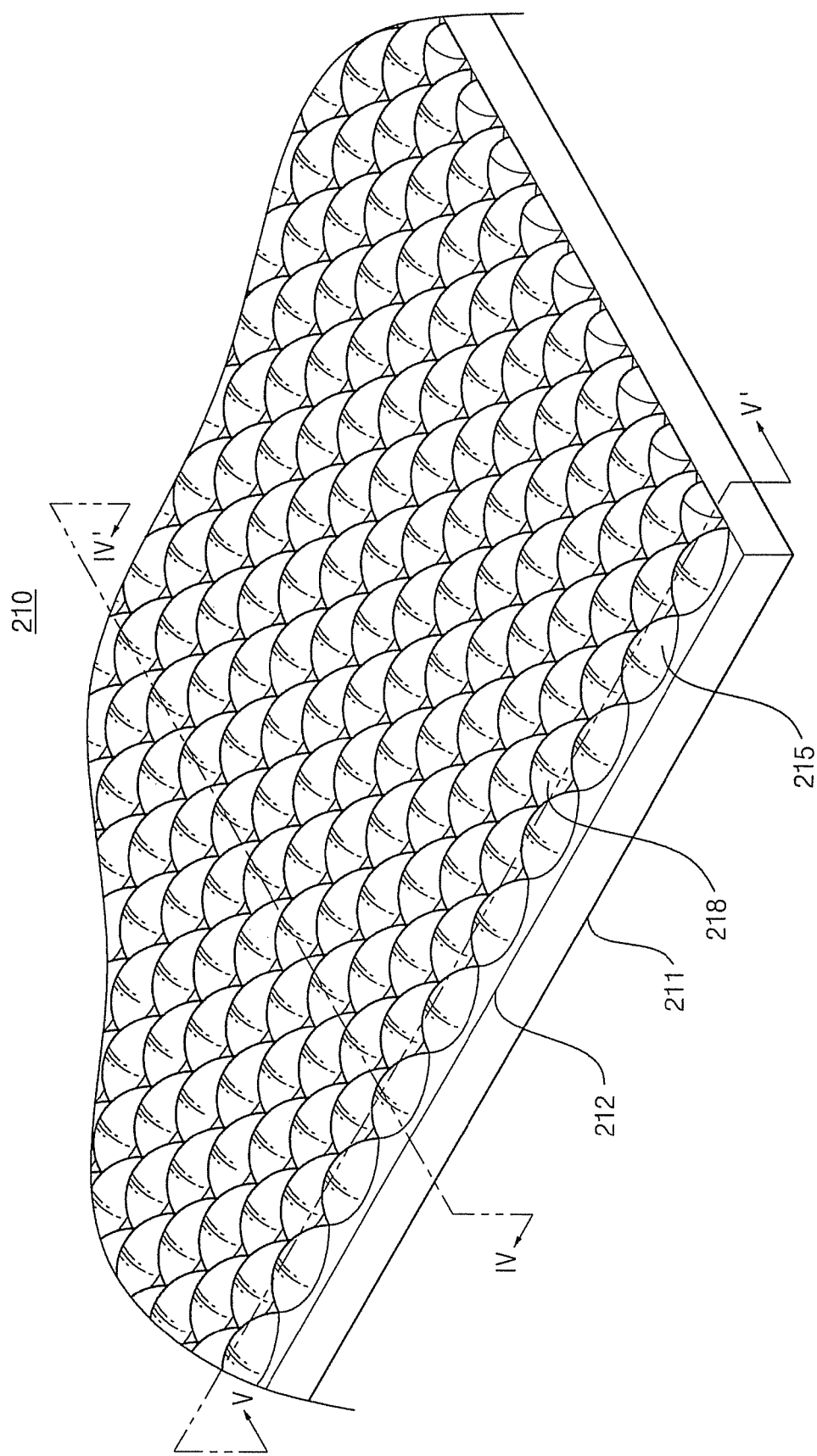
FIG. 8 is a partial perspective view of another exemplary embodiment of an optical sheet in accordance with the present invention.

FIG. 8 is a partial perspective view of another exemplary embodiment of an optical sheet in accordance with the present invention.

Referring to FIG. 8, an optical sheet 210 includes a first plane 211, a second plane 212, first and second optical patterns 215 and 218. The optical sheet 210 is substantially the same as the optical sheet in FIGS. 1 to 5 except for shapes of the first and the second optical patterns 215 and 218.

In particular, the first and the second optical patterns 215 and 218 have the same shape. The light-condensing portions of the first optical pattern 215 have, as shown in FIG. 8, a "rugby football shape" taken in a long-axis (e.g., longitudinal) direction along a column direction of the optical sheet 210. The "rugby football shape" may be considered as an elliptical longitudinal cross section that may have ends that do not come to a point.

End portions of the light-condensing portion are connected along the column direction. The first and the second optical patterns 215 and 218 include troughs J1 and J2 (See, FIGS. 9 and 10), respectively, connecting the end portions with crests being top portions of the light-condensing portion.

Figure 9:
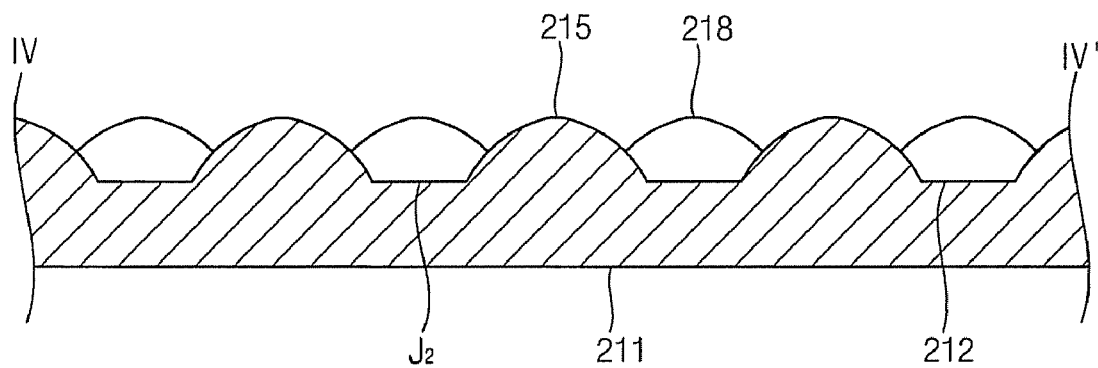
FIG. 9 is a partial cross-sectional view taken along line IV-IV' of the optical sheet in FIG. 8.
Figure 10:
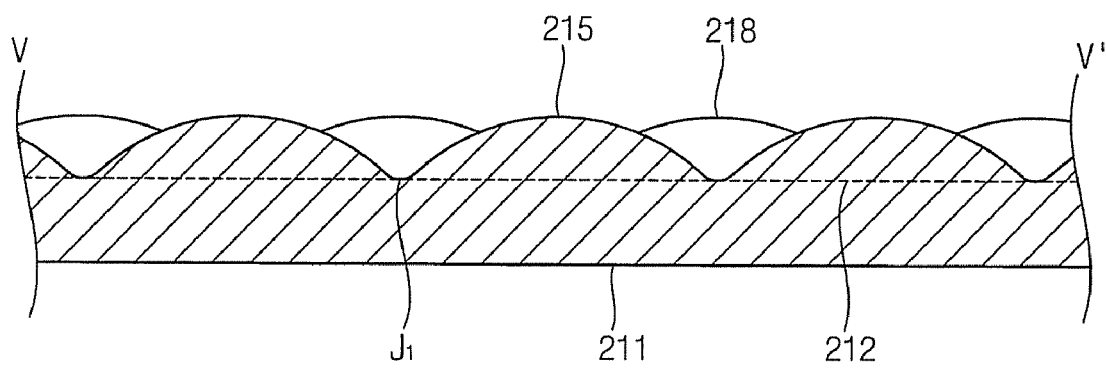
FIG. 10 is a partial cross-sectional view taken along line V-V' of the optical sheet in FIG. 8.

FIG. 9 is a partial cross-sectional view taken along line IV-IV' of the optical sheet in FIG. 8. FIG. 10 is a partial cross-sectional view taken along line V-V' of the optical sheet in FIG. 8. In particular, FIG. 9 is a cross-sectional view of the optical sheet 210 taken along the row direction from the crest of the first optical pattern 215 and FIG. 10 is a cross-sectional view of the optical sheet 210 taken along the odd-numbered column corresponding to the first optical pattern 215.

Referring to FIGS. 9 and 10, light-condensing portions of the first and the second optical patterns 215 and 218 have a convex shape in the column direction and the row direction relative to the second plane 212. The light-condensing portions of the first and the second optical patterns 215 and 218 also have a convex shape in the direction between the column and the row direction. Advantageously, incident light in substantially any direction to the first plane 211 are condensed to the perpendicular direction.

The troughs J1 of the first optical pattern 215 and the troughs J2 of the second optical pattern 158 adjoin the second plane 132. A first height h1 and a second height h2 of troughs J1 and J2, respectively, are considered to be zero (e.g., "0").

Figure 11:
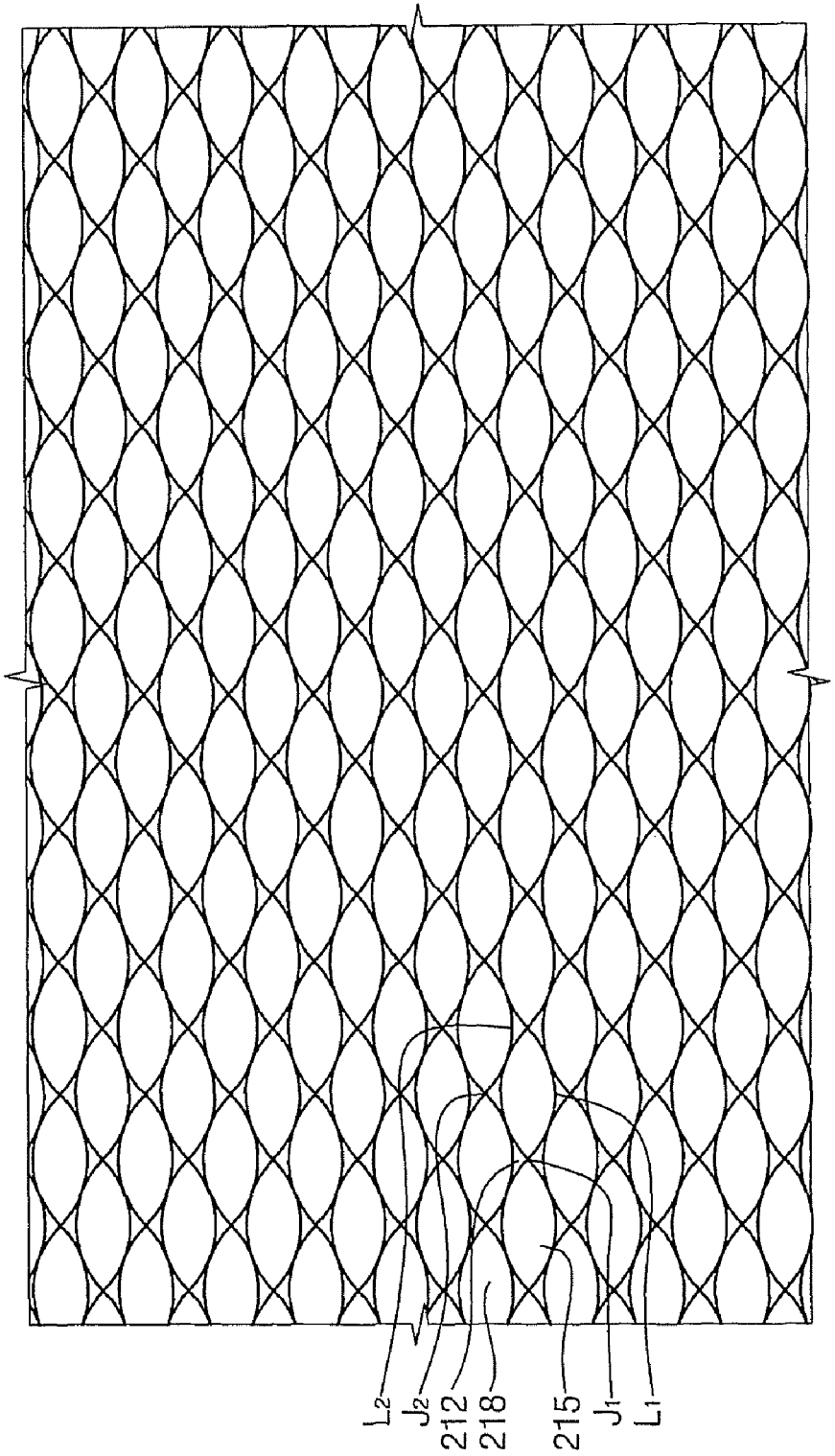
FIG. 11 is a plan view of the optical sheet showing in FIG. 8.

FIG. 11 is a plan view of the optical sheet showing in FIG. 8.

Referring to FIG. 11, for improving the efficiency of condensing lights, the light-condensing portions of the first and the second optical patterns 215 and 218 are disposed as densely and closely as possible. A portion of the second plane 212 is exposed where the first and the second optical patterns 215 and 218 are not disposed, such as on either side (e.g., in a row direction) of the first and second troughs J1 and J2.

In the illustrated embodiment, the crest of the second optical pattern 218 corresponds in location and/or position to the trough J1 of the first optical pattern 215. The crest of the first pattern 215 corresponds to the trough J2 of the second optical pattern 218. The first outline L1 and the second outline L2 are adjacent at points or portions of the outlines. Therefore, the disposing density of the light-condensing portions is improved.

Figure 12:
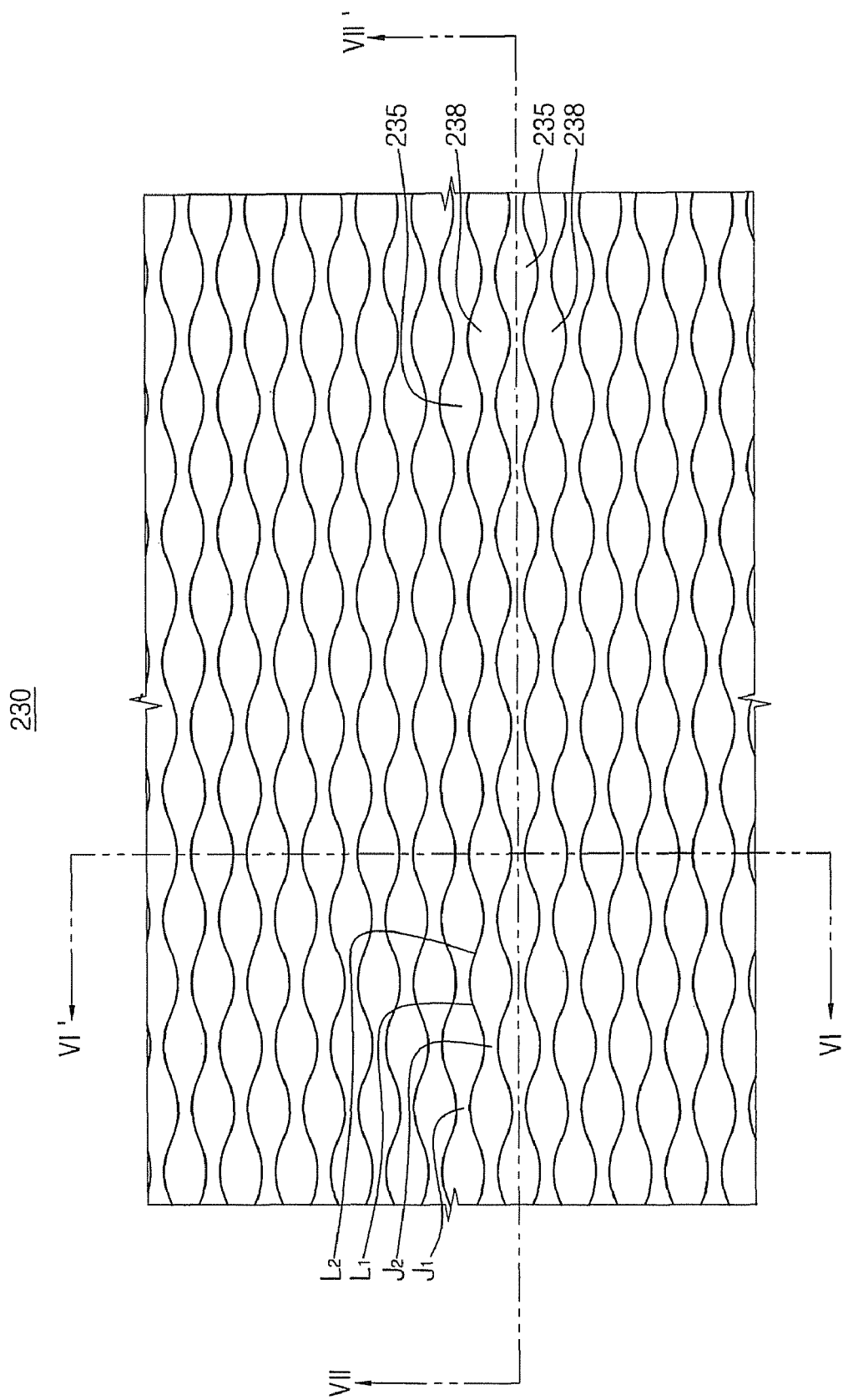
FIG. 12 is a plan view of another exemplary embodiment of an optical sheet in accordance with the present invention.

FIG. 12 is a plan view of another exemplary embodiment of an optical sheet in accordance with the present invention.

Referring to FIG. 12, an optical sheet 230 includes a first plane 231, a second plane 232, and first and second optical pattern 235 and 238. The optical sheet 230 is substantially the same as the optical sheet 130 in FIGS. 1 to 5 except shapes of the first and the second optical patterns 235 and 238.

The first and the second optical patterns 235 and 238 have a "rugby football shape" taken along a long-axis (e.g., longitudinal) direction. The crest of the second optical pattern 238 corresponds to the trough J1 of the first optical pattern 235. A first outline L1 and a second outline L2 are substantially coincident, and the first outline L1. The first outline L1 and the second outline L2 vibrate repeatedly between the odd-numbered column and the even-numbered column and have a wave shape extended to the column direction.

Figure 13:
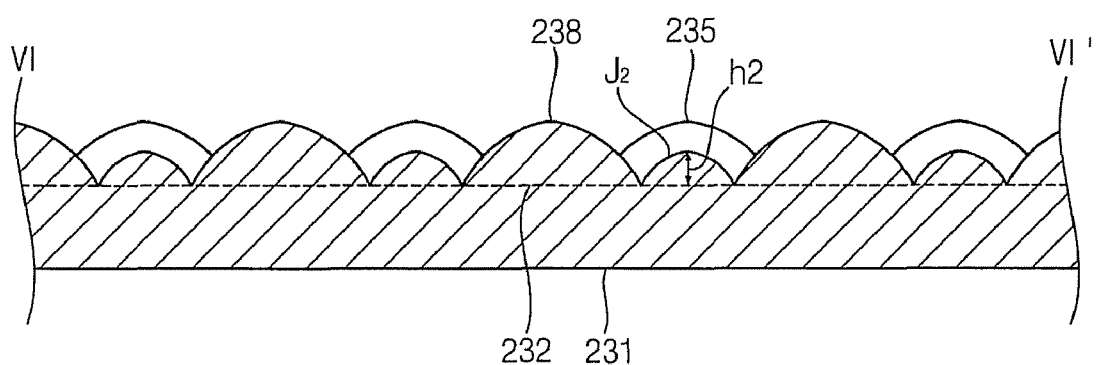
FIG. 13 is a partial cross-sectional view taken along line VI-VI' of the optical sheet in FIG. 12.
Figure 14:
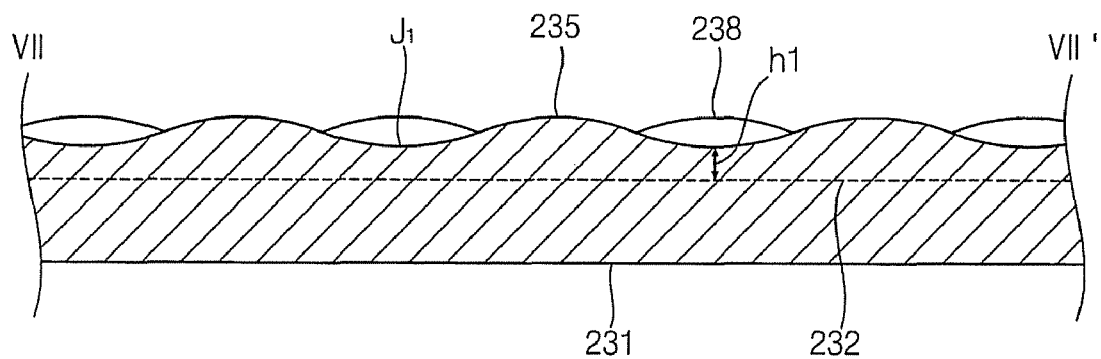
FIG. 14 is a partial cross-sectional view taken along line VII-VII' of the optical sheet in FIG. 12.

FIG. 13 is a partial cross-sectional view taken along line VI-VI' of the optical sheet in FIG. 12. FIG. 14 is a partial cross-sectional view taken along line VII-VII' of the optical sheet in FIG. 12. In particular, FIG. 13 is a cross-sectional view of the optical sheet 230 taken along a row direction corresponding to crests of the second optical pattern 238 and FIG. 14 is a cross-sectional view of the optical sheet 230 taken along the odd-numbered column (e.g., longitudinal) direction of the first optical pattern 235.

Referring to FIGS. 13 and 14, the first optical pattern 235 has a substantially convex shape in the column direction, the row direction and in the direction between the column direction and the row direction (e.g., a diagonal direction)). The trough J1 may be considered as having a concave shape as illustrated in FIG. 14 and the trough J2 may be considered as having a convex shape as illustrated in FIG. 13.

The trough J1 of the first optical pattern 235 has a first height h1 with respect to the second plane 232, the trough J2 of the second optical pattern 238 has a second height h2 with respect to the second plane 232 that is substantially the same height with respect to the first height h1. Widths of the of the first and second optical patterns 235 and 238 taken at a cross section corresponding to the crests of the optical patterns along a row direction are substantially the same as illustrated in FIGS. 12-14.

Figure 15:
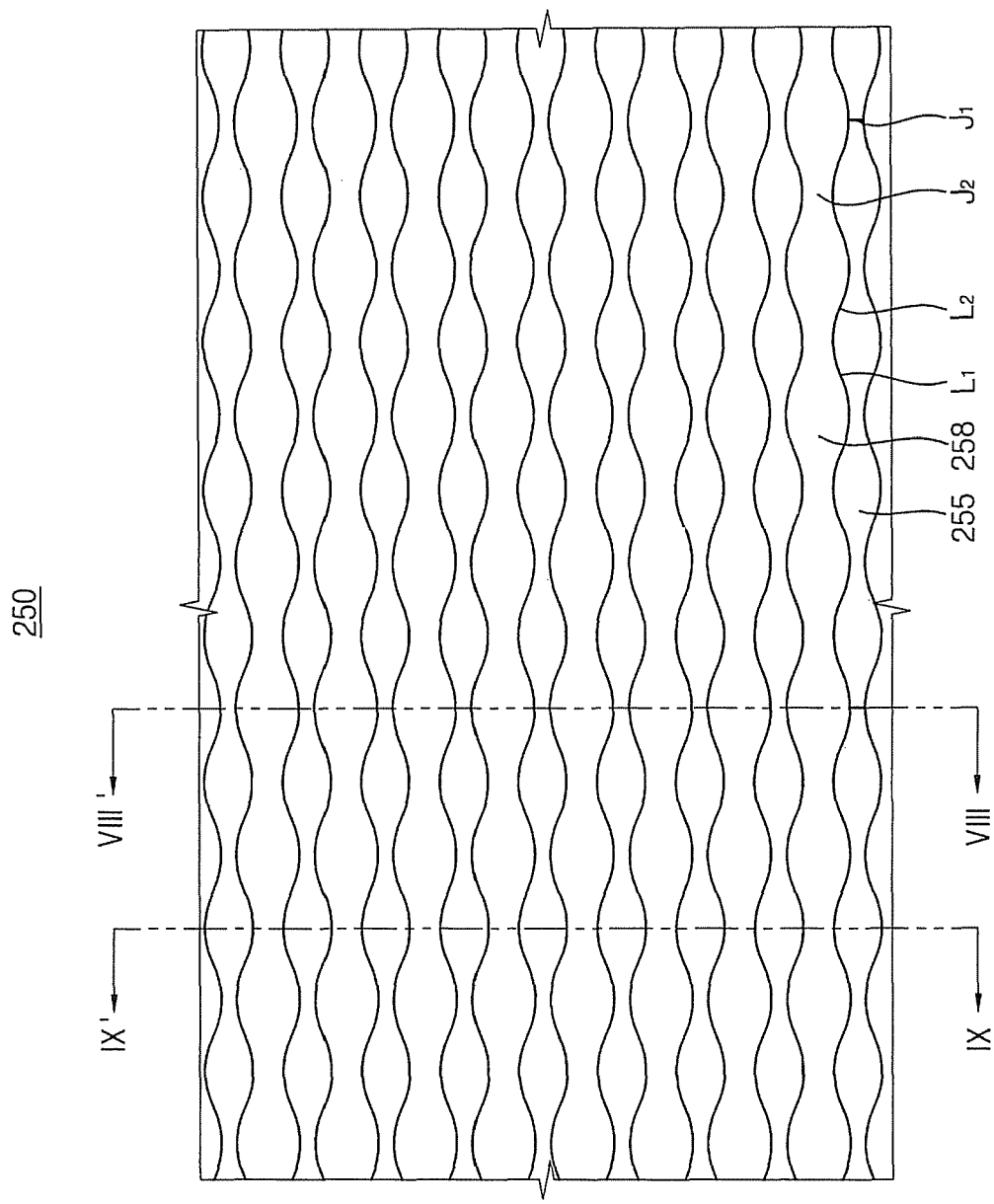
FIG. 15 is a plan view of another exemplary embodiment of an optical sheet in accordance with the present invention.

FIG. 15 is a plan view of another exemplary embodiment of an optical sheet in accordance with the present invention.

Referring to FIG. 15, an optical sheet 250 includes a first plane 251, a second plane 252, a first and a second optical pattern 255 and 258. The optical sheet 250 is substantially the same as the optical sheet 210 in FIGS. 8 to 10 except shapes of the first and the second optical patterns 255, 258.

The first and the second optical patterns 255 and 258 have a "rugby football" shape taken along a long-axis (e.g., longitudinal) direction of the pattern columns. The crest of the second optical pattern 258 corresponds to the trough J1 of the first optical pattern 255. A first outline L1 and a second outline L2 are substantially coincident, and the first outline L1 and the second outline L2 have a wave shape extended to the column direction, vibrating repeatedly between the odd-numbered column and the even-numbered column.

Figure 16:
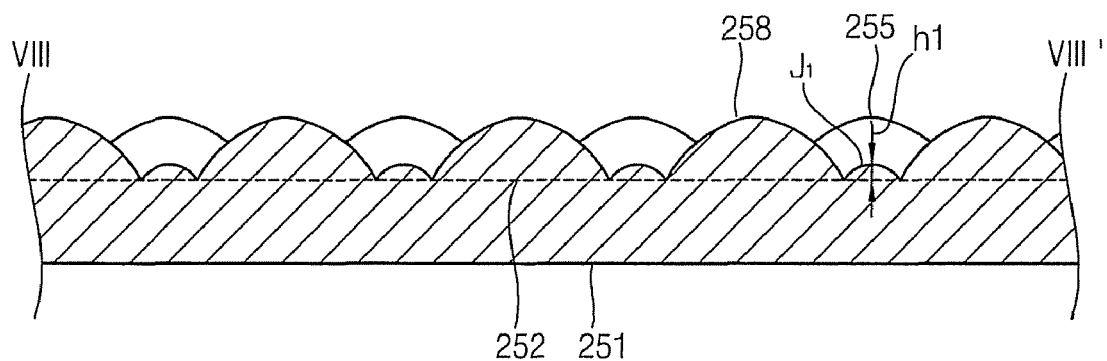
FIG. 16 is a partial cross-sectional view taken along line VIII-VIII' of the optical sheet in FIG. 15.
Figure 17:
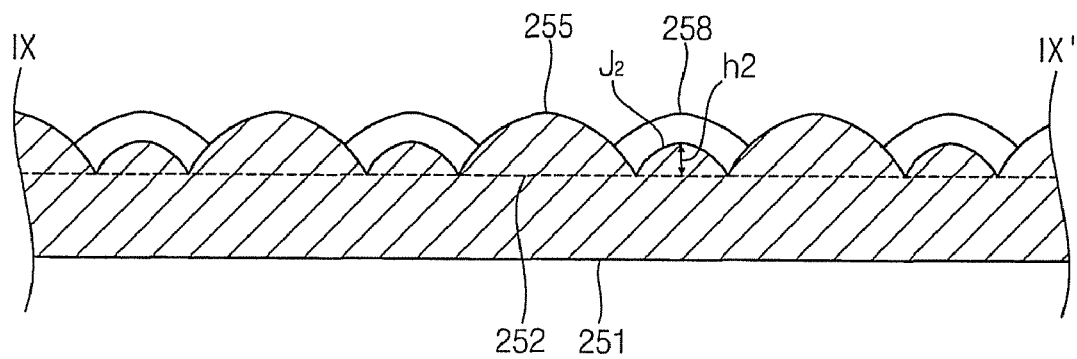
FIG. 17 is a partial cross-sectional view taken along line IX-IX' of the optical sheet in FIG. 15.

FIG. 16 is a partial cross-sectional view taken along line VIII-VIII' of the optical sheet in FIG. 15. FIG. 17 is a partial cross-sectional view taken along line IX-IX' of the optical sheet in FIG. 15. In particular, FIG. 16 is a cross-sectional view of the optical sheet 250 taken along a row direction corresponding to crests of the second optical pattern 258 and FIG. 16 is a cross-sectional view of the optical sheet 250 taken along a row direction corresponding to crests of the first optical pattern 255.

Referring to FIGS. 16 and 17, light-condensing portions of the first and the second optical patterns 255 and 258 have a convex shape to the column direction, the row direction and to the direction between the column direction and the row direction (e.g., a diagonal direction).

The trough J1 of the first optical pattern 255 has a first height h1 with respect to the second plane 252 and the trough J2 of the second optical pattern 258 has a second height h2, which is higher than the first height H1.

Figure 18:
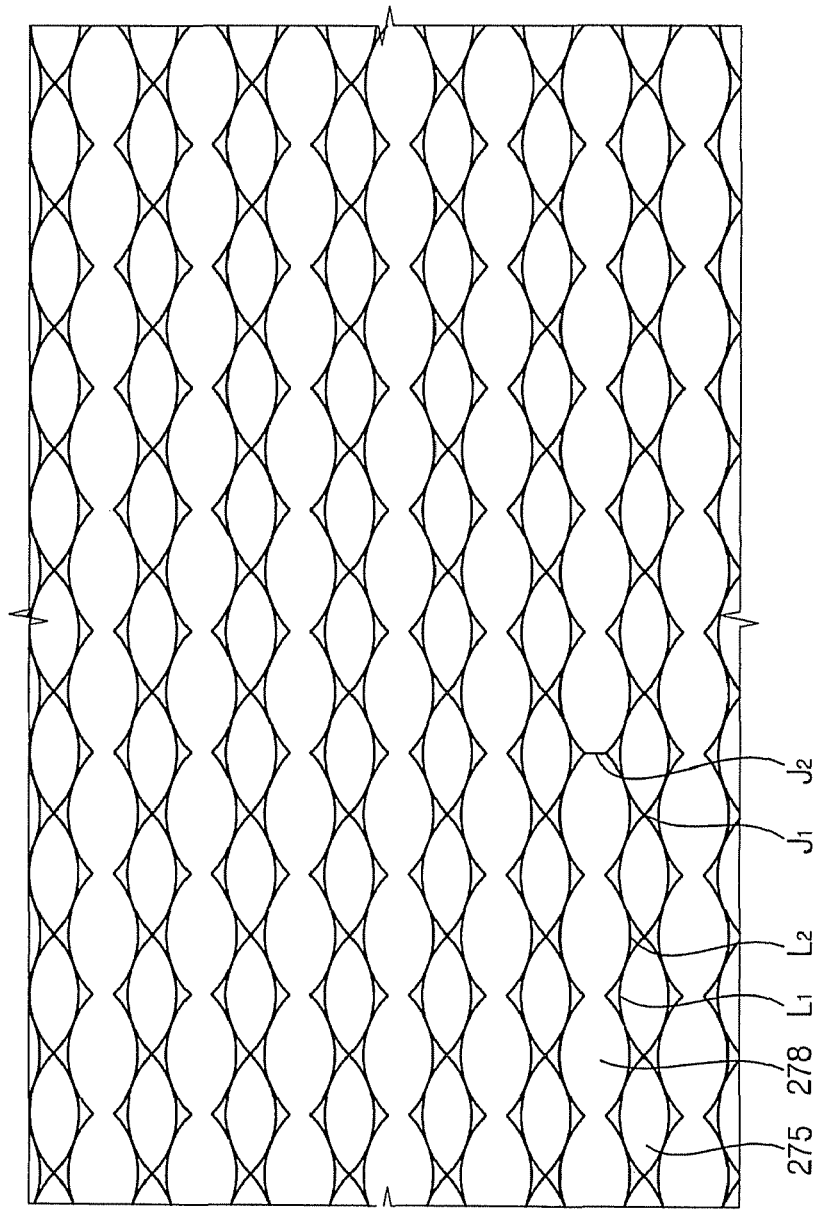
FIG. 18 is a plan view of another exemplary embodiment of an optical sheet in accordance with the present invention.

FIG. 18 is a plan view of another exemplary embodiment of an optical sheet in accordance with the present invention.

Referring to FIG. 18, the optical sheet 270 includes a first plane 251, a second plane 252, a plurality of first and second optical patterns 275 and 278. The optical sheet 270 is substantially the same as the optical sheet 210 in FIGS. 8 to 10 except shapes of the first and the second optical patterns 275 and 278.

The first and the second optical patterns 275 and 278 have a "rugby football" shape taken along a long-axis (e.g., longitudinal) direction. The crest of the second optical pattern 278 corresponds to the trough J1 of the first optical pattern 275 and the crest of the first optical pattern 275 corresponds to the trough J2 of the second optical pattern 278.

As shown in FIG. 18, end portions of light-condensing portions of the first optical patterns 275 adjoin the second plane 252 and are connected to each other. The trough J1 of the first optical pattern 275 adjoins the second plane 252. The troughs J2 of the second optical pattern 278 (as shown by the vertical line indicated by J2) have a second height h2 with respect to the second plane 252. Widths of the of the first and second optical patterns 275 and 278 taken at a cross section corresponding to the crests of the optical patterns along a row direction are different as illustrated in FIG. 18. The width of second optical pattern 278 is greater than the width of the first optical pattern 275.

A first outline L1 and a second outline L2 partially share a common side or portion of the outlines. The first outline L1 and the second outline L2 have a substantially wave shape extended in the column direction, vibrating repeatedly between the odd-numbered column and the even-numbered column.

Figure 19:
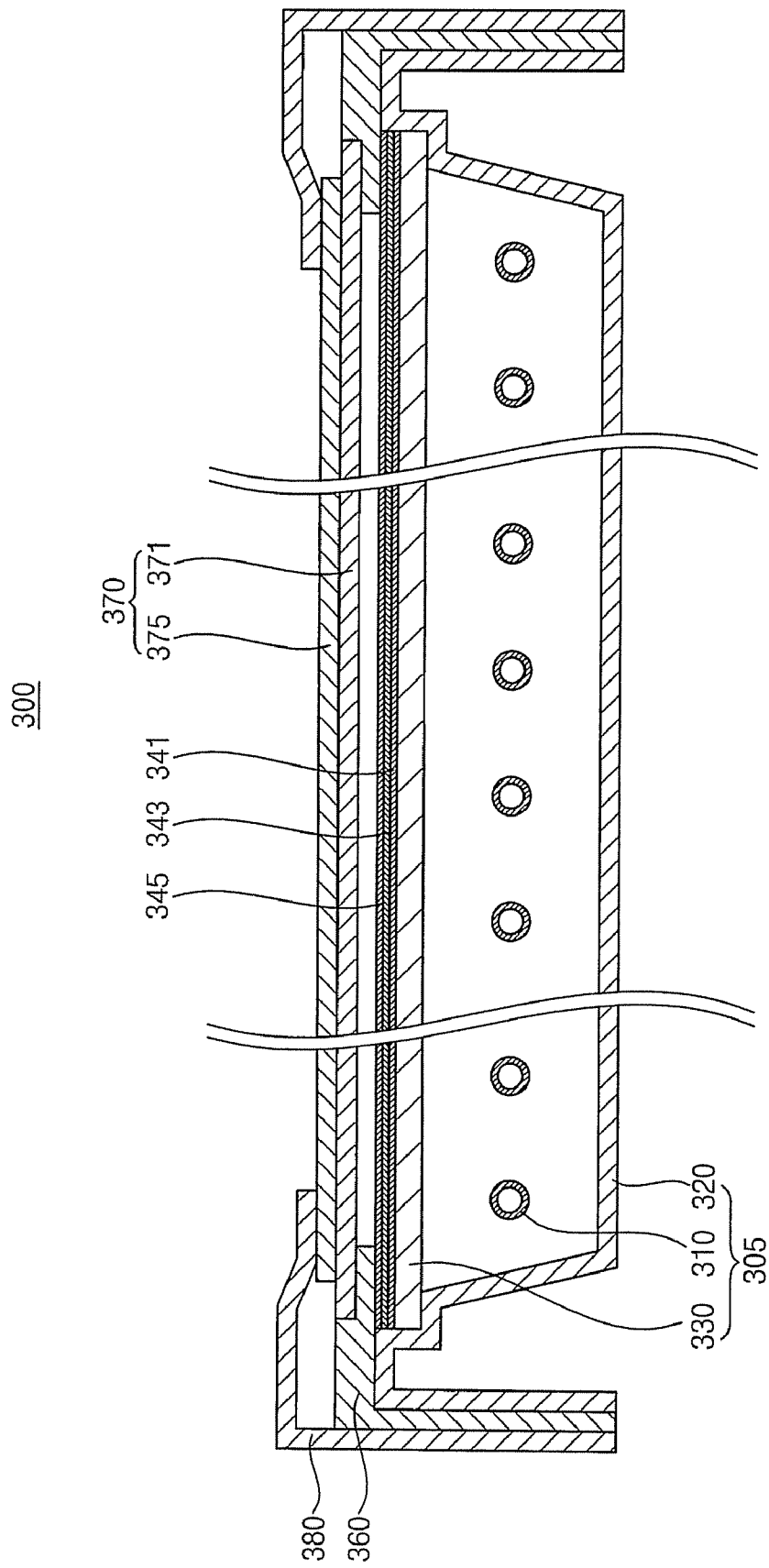
FIG. 19 is a cross-sectional view of an exemplary embodiment of a display device in accordance with the present invention.

FIG. 19 is a cross-sectional view of an exemplary embodiment of a display device in accordance with the present invention.

Referring to FIG. 19, a display device 300 includes a backlight assembly 305, an optical sheet 343 and a display panel 370.

The backlight assembly 305 includes a light source 310 and a diffusion plate 330. The light source 310 is a lamp emitting light, the diffusion plate 330 is disposed over an upper part of the lamp 310 and diffuses the light emitted from the lamp.

The backlight assembly 305 further includes a receiving container 320 and a diffusion sheet 341. The receiving container 320 receives the light source 310 and the diffusion plate 330. A diffusion sheet 341 is laminated on the diffusion plate 330 and diffuses the light emitted from the diffusion plate 330. The diffusion plate 330 diffuses light randomly. The diffusion sheet 341 diffuses light at a smaller emitting angle of the emitting light than the diffusion plate 330.

The optical sheet 343 may be one of the optical sheets 130, 150, 170, 210, 230, 250, and 270 as illustrated in FIGS. 1 to 18. As illustrated in FIG. 19, the optical sheet 343 is substantially the same as the optical sheet 130 in FIG. 1.

The optical sheet 343 is laminated on the diffusion sheet 341 and converges emitting light from the diffusion sheet 341 into the perpendicular direction of the diffusion sheet 341. The optical sheet 343 condenses light into a column direction, a row direction and/or the direction between the column direction and row direction (e.g., diagonal) by shapes of a first optical pattern and a second optical pattern.

The display device 300 further includes a protective sheet 345. The protective sheet 345 is laminated on the optical sheet 343, and reduced or effectively prevents damage of the first and the second optical patterns from scratches and so on.

In an exemplary embodiment, the protective sheet 345 may include a diffusion bead. The protective sheet 345 diffuses emitting light from the optical sheet 343 and protects excessive decrease of the viewing angle from a display panel 370 being described later.

The display panel 370 displays images based on the light provided from the protective sheet 345. The display panel 370 includes a first substrate 371, a second substrate 375 facing the first substrate 371 and a liquid crystal layer (not shown) between the first and second substrates 371 and 375. Facing electrodes are formed on the first and second substrate 371 and 375. By an electronic field formed by the electrodes, the arrangement of the liquid crystal layer is changed and the amount of light transmitting the liquid crystal layer is controlled. Thereby, the display device 300 displays images on the display panel 370.

The display device 300 further includes a middle mold 360 and a top chassis 380. The middle mold 360 presses the ridges of the protective sheet 345 and combines with the receiving container 320. The top chassis exposes an available display area of the display panel 370 and combines with the middle mold 360 and/or the receiving container 320.

Figure 20A:
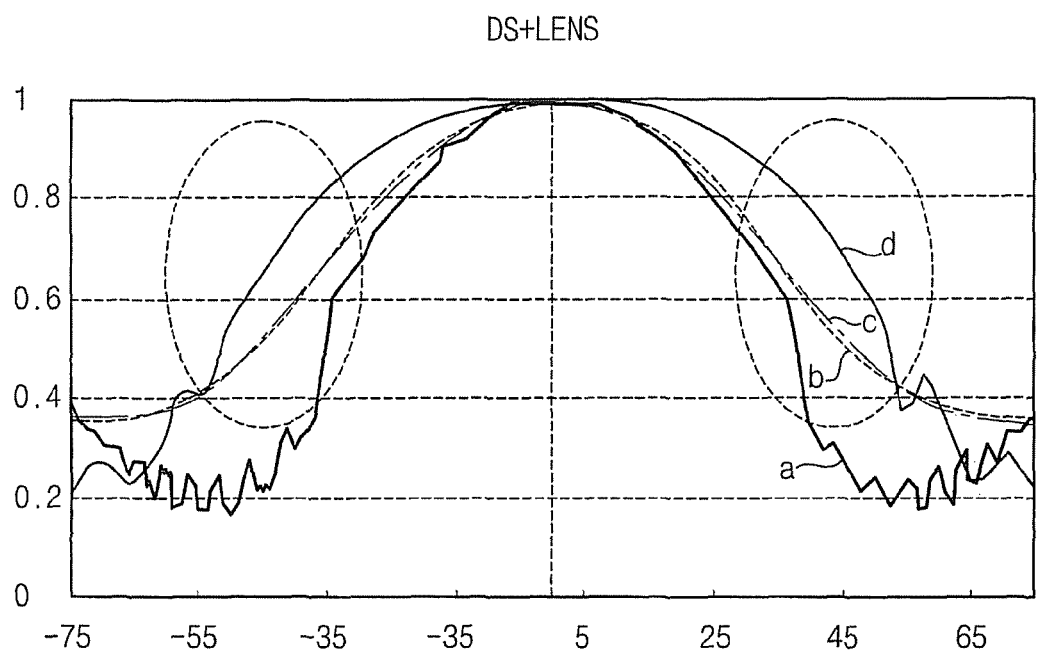
FIGS. 20A and 20B are graphs showing an exemplary embodiment of a condensing effect of the display device in FIG. 19.
Figure 20B:
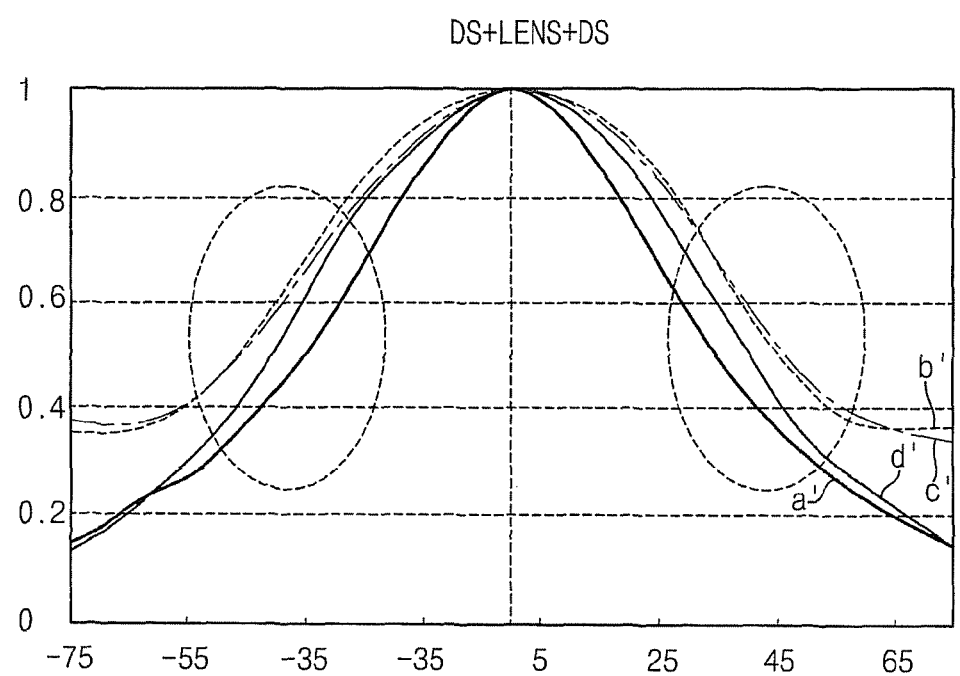

FIGS. 20A and 20B are graphs showing an exemplary embodiment of a condensing effect of the display device in FIG. 19.

The graphs in FIGS. 20A and 20B, represent the viewing angle from the display panel 370 when three diffusion sheets 341 are laminated and represents the viewing angle when the optical sheet 343 is used.

In particular, FIG. 20A is the graph of the viewing angle from the display panel 370 when the diffusion sheet 341 "DS" and the optical sheet 343 "LENS" are laminated. FIG. 20B is the graph of the viewing angle from the display panel 370 when the diffusion sheet 341 "DS", the optical sheet 343 "LENS" and the protective sheet 345 "DS" are laminated. The protective sheet 345 also diffuses light, so that the protective sheet 345 will be referred to as DS hereinafter, which is substantially the same as the diffusion sheet 341.

In FIGS. 20A and 20B, a vertical direction corresponds to the row direction of the optical sheet 343 and a horizontal direction corresponds to the column direction of the optical sheet 343.

Referring to FIG. 20A, a graph 'a' represents a vertical viewing angle distribution and a graph 'd' represents horizontal viewing angle distribution when only the optical sheet 343 LENS is laminated. Graphs 'b', 'c' respectively represent horizontal and vertical angle distributions, when the diffusion sheet 341 DS and the optical sheet 343 LENS are laminated.

When the diffusion sheet 341 DS and the optical sheet 343 LENS are laminated, the viewing angle of the vertical direction is smaller and the viewing angle of the horizontal direction is bigger than when three diffusion sheets 341 are laminated.

Referring to FIG. 20B, a graph 'a' represents a vertical viewing angle distribution and a graph 'd' represents horizontal viewing angle distribution when the diffusion sheet 341 DS and the optical sheet 343 LENS are laminated. Graphs 'b', 'c' respectively represent horizontal and vertical angle distributions, when the diffusion sheet 341 "DS", the optical sheet 343 "LENS" and the protective sheet 345 "DS" are laminated.

When the optical sheet 343 "LENS" and the protective sheet 345 "DS" are laminated, the viewing angle of the vertical direction is bigger and the viewing angle of the horizontal direction is smaller than when three diffusion sheets 341 are laminated. Consequentially, the viewing angle is almost the same as in the case when three diffusion sheets 341 are laminated.

Therefore, when condensing light with the optical sheet 343, for increasing light condensed to the column direction and a better viewing angle, as shown in FIG. 20B, diffusion sheet 341 "DS", the optical sheet 343 "LENS" and the protective sheet 345 "DS" is preferably laminated.

Figure 21:
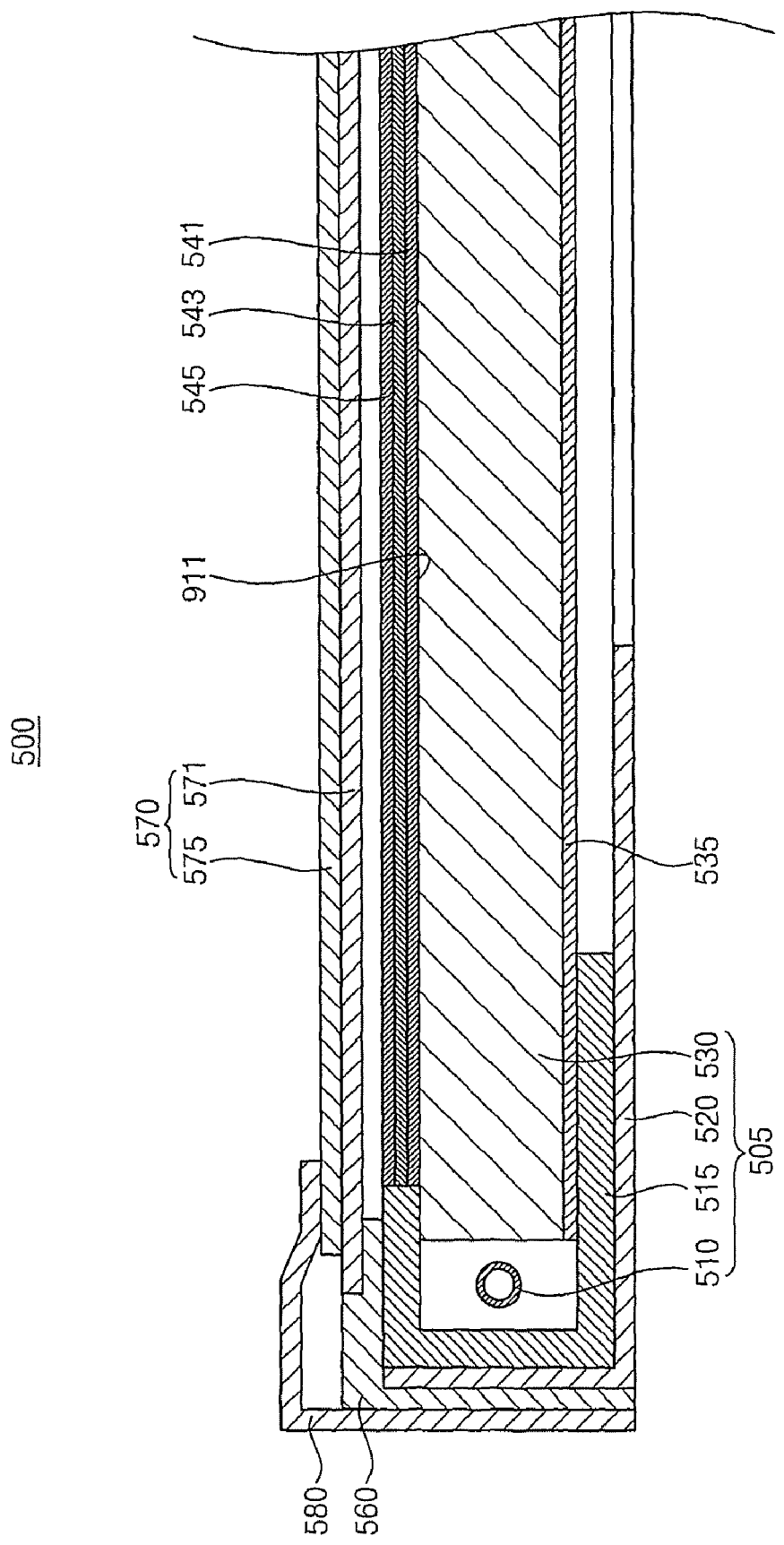
FIG. 21 is a cross-sectional view of another exemplary embodiment of a display device in accordance with the present invention.

FIG. 21 is a cross-sectional view of another exemplary embodiment of a display device in accordance with the present invention.

Referring to FIG. 21, the display device 500 includes a backlight assembly 505, an optical sheet 543, a protective sheet 545 and a display panel 570. The display device 500 is substantially the same as the display device 300 in FIG. 19 except for the backlight assembly 505.

The backlight assembly 505 includes a light source 510 and a light guide unit 530. The light guide unit 530 guides the light incident from the side and emits into the optical sheet 543.

The backlight assembly 505 further includes a receiving container 520, a lamp reflector 515, a reflecting sheet 535 and a diffusion sheet 541. The receiving container 520 receives the light guide unit 530 and a lamp. The lamp reflector 515 covers the lamp functioning as the light source 510 and reflects the light emitting from the lamp 510 toward the side.

The reflecting sheet 535 is disposed on a rear side of the light guide unit 530 and reflects leaking light. The diffusion sheet 541 is disposed on the emitting surface 911 of the light guide unit 530 and diffuses the emitted light from the light guide unit 530. The optical sheet 543 and the protective sheet 545 are laminated on the diffusion sheet 541.

The display panel 570 is guided by a middle mold 560 and is fastened by a top chassis 580.

As in the illustrated exemplary embodiments optical patterns of an optical sheet are disposed to include coinciding outlines in part or in full. Advantageously, the amount of condensing light of the optical sheet is improved.

In the illustrated embodiments, the light-condensing portions of the optical patterns have a solid shape to condense light from a column direction, a row direction and/or a direction between the column direction and the row direction. A vertex angle of a second optical pattern is formed differently from a vertex angle of a first optical pattern and the amount of condensing light from a column direction and/or a row direction may be controlled. Thereto, control of the amount of the condensing light from a column direction and/or a row direction is available.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. An optical sheet comprising:
   a first plane;
   a second plane opposite to the first plane; and
   a plurality of optical patterns formed on the second plane along a plurality of columns, the optical patterns including a plurality of convex light-condensing portions connected to each other and forming crests and troughs,
   wherein troughs in a first optical pattern have a height different from a height of troughs disposed between the first optical pattern, and a second optical pattern adjacent to the first optical pattern, the heights taken with respect to the second plane.

2. The optical sheet of claim 1, wherein optical patterns disposed in odd-numbered columns are arranged alternatively with optical patterns disposed in even-numbered columns.

3. The optical sheet of claim 2, wherein the troughs of the optical patterns disposed in the odd-numbered columns include a first height with respect to the second plane, and
   the troughs of the optical patterns disposed in the even-numbered columns have a second height with respect to the second plane, the second height being greater than the first height.

4. The optical sheet of claim 3, wherein the optical patterns disposed in the odd-numbered columns share common sides with the optical patterns disposed in the even-numbered columns.

5. The optical sheet of claim 2, wherein the troughs of the optical patterns disposed in the odd-numbered column have substantially same height with respect to the second plane as the troughs of the optical patterns disposed in the even-numbered columns.

6. The optical sheet of claim 2, wherein the optical patterns disposed in adjacent columns share common sides forming a zigzag shape along a longitudinal direction of the columns.

7. The optical sheet of claim 2, wherein the common side of the optical patterns in the adjacent columns form a wave shape along a longitudinal direction of the columns.

8. The optical sheet of claim 2, wherein a width of a cross-section of the light condensing portion in odd-numbered columns is greater than a width of a cross section of the light condensing portion in even-numbered columns.

9. An optical sheet comprising:
a first plane;
a second plane opposite to the first plane; and
a plurality of optical patterns disposed on the second plane along a plurality of columns, the optical patterns including a plurality of convex light-condensing portions connected to each other and forming crests and troughs, wherein the convex light-condensing portion comprises:
two first ridges between adjacent troughs and adjacent crests along a longitudinal direction of the columns; and
two second ridges between each of the troughs and adjacent crests along a horizontal direction substantially in perpendicular to the longitudinal direction.

10. The optical sheet of claim 9, wherein the first ridges disposed in each of the odd-numbered columns form a first vertex angle and the first ridges disposed in each of the even-numbered columns form a second vertex angle, and
wherein each of the first vertex angle and the second vertex angle is between about 85 degrees and about 95 degrees.

11. The optical sheet of claim 9, wherein vertexes of the light condensing portions in the odd-numbered columns and even-numbered columns are rounded.

12. The optical sheet of claim 9, wherein the second ridges are connected to the troughs of the adjacent columns.

13. The optical sheet of claim 9, wherein the first ridges disposed in each of the odd-numbered columns form a first vertex angle, and
the first ridges disposed in each of the even-numbered columns form a second vertex angle that is greater than the first vertex angle.

14. An optical sheet comprising:
a first plane;
a second plane opposite to the first plane; and
a plurality of optical patterns formed on the second plane along a plurality of columns. the optical patterns including a plurality of convex light-condensing portions connected to each other and forming crests and troughs,
wherein a cross-section of the light-condensing portion taken along a horizontal direction substantially in perpendicular to a longitudinal direction of the columns has a rugby football shape.

15. A display device comprises:
a backlight assembly emitting light;
an optical sheet including;
a first plane;
a second plane opposite to the first plane; and
a plurality of optical patterns formed on the second plane along a plurality of columns, the optical patterns including a plurality of convex light-condensing portions connected to each other and forming crests and troughs,
wherein troughs in a first optical pattern have a height different from a height of troughs disposed between the first optical pattern, and a second optical pattern adjacent to the first optical pattern, the heights taken with respect to the second plane; and
a display panel disposed on the optical sheet to display images based on light emitting from the optical sheet.

16. The display device of claim 15, wherein the backlight assembly comprises:
a light source disposed under the optical sheet and generating the light; and
a diffusion plate disposed between the light source and the optical sheet diffusing the light.

17. The display device of claim 15, further comprising a diffusing sheet disposed between the diffusion plate and the optical sheet.

18. The display device of claim 15, wherein the backlight assembly comprises:
a light source generating the light; and
a light guide unit guiding the light incident into the light guide unit through a side surface of the light guide unit to emit the light to the optical sheet.

19. The display device of claim 15, further comprising a protective sheet disposed on the optical sheet to protect the optical patterns.

* * * * *